(12) United States Patent
Kramer et al.

(10) Patent No.: US 7,870,265 B2
(45) Date of Patent: Jan. 11, 2011

(54) SYSTEM AND METHOD FOR MANAGING COMMUNICATIONS SESSIONS IN A NETWORK

(75) Inventors: Reto Kramer, Berkeley, CA (US); Anno R. Langen, Berkeley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 11/378,188

(22) Filed: Mar. 17, 2006

(65) Prior Publication Data

US 2007/0005770 A1    Jan. 4, 2007

Related U.S. Application Data

(60) Provisional application No. 60/695,321, filed on Jun. 30, 2005.

(51) Int. Cl.
    *G06F 15/16*    (2006.01)
(52) U.S. Cl. .................................................. 709/227
(58) Field of Classification Search ........................ None
    See application file for complete search history.

(56) References Cited

U.S. PATENT DOCUMENTS

| | | | |
|---|---|---|---|
| 5,440,727 | A | 8/1995 | Bhide et al. |
| 5,659,596 | A | 8/1997 | Dunn |
| 6,052,724 | A | 4/2000 | Willie et al. |
| 6,067,301 | A | 5/2000 | Aatresh et al. |
| 6,134,673 | A | 10/2000 | Chrabaszcz |
| 6,208,870 | B1 | 3/2001 | Lorello et al. |
| 6,279,076 | B1 | 8/2001 | Shishido et al. |
| 6,292,833 | B1 | 9/2001 | Liao et al. |
| 6,480,862 | B1 | 11/2002 | Gall |
| 6,578,076 | B1 | 6/2003 | Putzolu |
| 6,611,867 | B1 | 8/2003 | Bowman-Amuah |
| 6,621,793 | B2 | 9/2003 | Widegren et al. |
| 6,625,751 | B1 | 9/2003 | Starovic et al. |
| 6,629,260 | B1 | 9/2003 | Dancer et al. |
| 6,701,519 | B1 | 3/2004 | Cowan |
| 6,704,933 | B1 | 3/2004 | Tanaka |
| 6,708,206 | B1 | 3/2004 | Thrane |
| 6,721,286 | B1 | 4/2004 | Williams et al. |
| 6,747,970 | B1 | 6/2004 | Lamb |
| 6,823,477 | B1 | 11/2004 | Cheng et al. |

(Continued)

OTHER PUBLICATIONS

Zhuang, Wei, et al., "Policy Based QoS Architecture in the IP Multimedia Subsystem of UMTS," IEEE Network, May/Jun. 2003, pp. 51-57.

(Continued)

*Primary Examiner*—Ario Etienne
*Assistant Examiner*—Clayton R Williams
(74) *Attorney, Agent, or Firm*—Fliesler Meyer LLP (57) ABSTRACT

In an embodiment, a system for managing communications sessions is provided. The system embodiment includes a connection to a packet network that receives incoming calls. A stateful tier manages communications sessions established for the at least one incoming call. A stateless tier comprising one or more applications provides service(s) to the communications sessions in the stateful tier. One or more servers allocate and/or manage resources corresponding to the communications sessions established for the incoming calls in the stateful tier. The servers maintain the applications in the stateless tier for providing services to the communications sessions in the stateful tier.

18 Claims, 5 Drawing Sheets

U.S. PATENT DOCUMENTS

| | | | |
|---|---|---|---|
| 6,862,689 B2 * | 3/2005 | Bergsten et al. | 714/4 |
| 6,888,828 B1 | 5/2005 | Partanen et al. | |
| 6,961,776 B1 | 11/2005 | Buckingham et al. | |
| 6,965,777 B1 | 11/2005 | Cast et al. | |
| 6,988,133 B1 | 1/2006 | Zavalkovsky et al. | |
| 7,039,037 B2 | 5/2006 | Wang et al. | |
| 7,050,424 B2 * | 5/2006 | Cheng et al. | 370/352 |
| 7,058,046 B2 * | 6/2006 | Celi et al. | 370/352 |
| 7,076,562 B2 | 7/2006 | Singhal et al. | |
| 7,082,102 B1 | 7/2006 | Wright | |
| 7,089,307 B2 | 8/2006 | Zintel et al. | |
| 7,142,876 B2 | 11/2006 | Trossen et al. | |
| 7,283,539 B2 | 10/2007 | Wang et al. | |
| 7,301,905 B1 | 11/2007 | Tontiruttananon et al. | |
| 7,380,073 B2 | 5/2008 | Shorb | |
| 7,392,421 B1 | 6/2008 | Bloomstein et al. | |
| 7,464,178 B2 | 12/2008 | Corrigan et al. | |
| 7,506,194 B2 | 3/2009 | Appanna et al. | |
| 2001/0030970 A1 | 10/2001 | Wiryaman et al. | |
| 2002/0036983 A1 | 3/2002 | Widegren et al. | |
| 2002/0039532 A1 | 4/2002 | El-Fekih et al. | |
| 2002/0065034 A1 | 5/2002 | Zhang | |
| 2002/0073404 A1 | 6/2002 | Sokolov et al. | |
| 2002/0075844 A1 | 6/2002 | Hagen | |
| 2002/0077134 A1 | 6/2002 | Mizell | |
| 2002/0129174 A1 | 9/2002 | LaBaw | |
| 2002/0144119 A1 | 10/2002 | Benantar et al. | |
| 2002/0147749 A1 | 10/2002 | Ortiz et al. | |
| 2002/0159387 A1 | 10/2002 | Allison et al. | |
| 2003/0028529 A1 | 2/2003 | Cheung et al. | |
| 2003/0033524 A1 | 2/2003 | Tran et al. | |
| 2003/0055920 A1 | 3/2003 | Kakadia et al. | |
| 2003/0093695 A1 | 5/2003 | Dutta | |
| 2003/0095540 A1 | 5/2003 | Mulligan | |
| 2003/0120593 A1 | 6/2003 | Bansal | |
| 2003/0125021 A1 | 7/2003 | Tell et al. | |
| 2003/0131116 A1 | 7/2003 | Jain et al. | |
| 2003/0158908 A1 | 8/2003 | Jacobs et al. | |
| 2003/0227926 A1 | 12/2003 | Ramamurthy et al. | |
| 2004/0002881 A1 | 1/2004 | Hu et al. | |
| 2004/0116117 A1 | 6/2004 | Ahvonen et al. | |
| 2004/0117794 A1 | 6/2004 | Kundu | |
| 2004/0139204 A1 | 7/2004 | Ergezinger et al. | |
| 2004/0148357 A1 | 7/2004 | Corrigan et al. | |
| 2004/0160911 A1 | 8/2004 | Zilliacus et al. | |
| 2004/0168162 A1 | 8/2004 | Park et al. | |
| 2004/0196858 A1 | 10/2004 | Tsai et al. | |
| 2004/0213156 A1 | 10/2004 | Smallwood et al. | |
| 2004/0218619 A1 | 11/2004 | Salo | |
| 2004/0223602 A1 | 11/2004 | Honkasolo et al. | |
| 2004/0230682 A1 | 11/2004 | Immonen | |
| 2004/0246822 A1 | 12/2004 | Wong | |
| 2004/0246947 A1 | 12/2004 | Wong | |
| 2004/0258238 A1 * | 12/2004 | Wong | 379/900 |
| 2004/0260967 A1 | 12/2004 | Guha et al. | |
| 2004/0267882 A1 * | 12/2004 | Whynot et al. | 709/204 |
| 2005/0005022 A1 | 1/2005 | Taylor | |
| 2005/0022047 A1 | 1/2005 | Chandrasekaran | |
| 2005/0022210 A1 | 1/2005 | Zintel et al. | |
| 2005/0025050 A1 | 2/2005 | Roeder | |
| 2005/0044188 A1 | 2/2005 | Nakazawa et al. | |
| 2005/0044233 A1 | 2/2005 | Cai et al. | |
| 2005/0091362 A1 | 4/2005 | Shigeta et al. | |
| 2005/0097367 A1 | 5/2005 | Nakazawa et al. | |
| 2005/0117576 A1 | 6/2005 | McDysan et al. | |
| 2005/0117602 A1 | 6/2005 | Carrigan et al. | |
| 2005/0152336 A1 * | 7/2005 | Bratt et al. | 370/352 |
| 2005/0185661 A1 | 8/2005 | Scott et al. | |
| 2005/0203962 A1 | 9/2005 | Zhou et al. | |
| 2005/0203994 A1 | 9/2005 | Palmer et al. | |
| 2005/0207432 A1 * | 9/2005 | Velez-Rivera et al. | 370/401 |
| 2005/0226225 A1 | 10/2005 | Shigeta | |
| 2005/0237999 A1 | 10/2005 | Shores et al. | |
| 2005/0259806 A1 * | 11/2005 | Chang | 379/218.01 |
| 2005/0265276 A1 | 12/2005 | Takeda et al. | |
| 2006/0002333 A1 | 1/2006 | Skog et al. | |
| 2006/0010224 A1 | 1/2006 | Sekar et al. | |
| 2006/0109818 A1 | 5/2006 | Ramanna | |
| 2006/0128409 A1 | 6/2006 | Gress et al. | |
| 2006/0174271 A1 | 8/2006 | Chen et al. | |
| 2006/0225108 A1 | 10/2006 | Tabassi et al. | |
| 2007/0005766 A1 | 1/2007 | Singhal et al. | |
| 2007/0011617 A1 | 1/2007 | Akagawa et al. | |
| 2007/0195779 A1 | 8/2007 | Judge et al. | |
| 2007/0208862 A1 | 9/2007 | Fox et al. | |
| 2008/0021939 A1 | 1/2008 | Dahlstedt et al. | |
| 2008/0126832 A1 | 5/2008 | Morosan et al. | |
| 2008/0256257 A1 | 10/2008 | Miller et al. | |

OTHER PUBLICATIONS

Kristensen, A., "SIP Servlet API Version 1.0," Internet article [online], Feb. 4, 2003, http://jcp.org/en/jsr/detail?id=116> [retrieved on Mar. 6, 2009], p. 1-section 1, p. 4-section 1.4.2.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

BEA Systems, Inc., BEA WebLogic SIP Server: Configuring and Managing WebLogic SIP Server, Dec. 2, 2005, BEA Systems, Inc., Version 2.1, pp. 4-13.

Coward et al., Java Servlet Specification v2.4, Nov. 24, 2003, pp. 1-330.

Magedanz et al., The IMS Playground @ FOKUS—An Open Testbed for Generation Network Multimedia Services, Feb. 23-25, 2005, pp. 1, 6.

Rosenberg et al., Best Current Practices for Third Party Call Control in the SIP, Apr. 2004, Network Working Group, RFC 3725, pp. 1-32.

International Search Report and Written Opinion for PCT/US07/69023 dated Aug. 25, 2008, 8 pages.

International Search Report and Written Opinion for PCT/US06/11429 dated Aug. 7, 2007, 7 pages.

International Search Report and Written Opinion for PCT/US06/11165 dated Oct. 22, 2007, 7 pages.

International Search Report and Written Opinion for PCT/US07/69021 dated Jul. 25, 2008, 10 pages.

* cited by examiner

SYSTEM AND METHOD FOR MANAGING COMMUNICATIONS SESSIONS IN A NETWORK

CLAIM TO PRIORITY

The present application claims the benefit of U.S. Patent Application No. 60/695,321, entitled SYSTEM AND METHOD FOR MANAGING COMMUNICATIONS SESSIONS IN A NETWORK, by Reto Kramer and Anno Langen, filed Jun. 30, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications, and more particularly to a mechanism for managing communications sessions in a network.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VOIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. One proposed solution is the service delivery platform (SDP), a services development platform intended to isolate the service developer from the complexities of the underlying network. Such service delivery platforms, while addressing the issue of providing a development platform for such services, often cannot provide integrated solutions for the delivery of data, voice and other multimedia applications in the network environment with sufficient speed and performance to satisfy users.

What is needed are improved techniques for delivering data, voice and other multimedia capable services over networks.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for managing communications sessions in a network. These mechanisms and methods can enable embodiments to manage communications sessions using a stateful tier and manage applications associated with the communications session using a stateless tier. The ability of embodiments to provide independent management of communications sessions and applications associated with the communications sessions in stateful and stateless tiers can enable embodiments to provide improved availability, scalability and reliability.

In an embodiment, a system for managing communications sessions is provided. The system embodiment includes a connection to a packet network that receives incoming calls. A stateful tier manages communications sessions established for the at least one incoming call. A stateless tier comprising one or more applications provides service(s) to the communications sessions in the stateful tier. One or more servers allocate and/or manage resources corresponding to the communications sessions established for the incoming calls in the stateful tier. The servers maintain the applications in the stateless tier for providing services to the communications sessions in the stateful tier.

Figure 1:
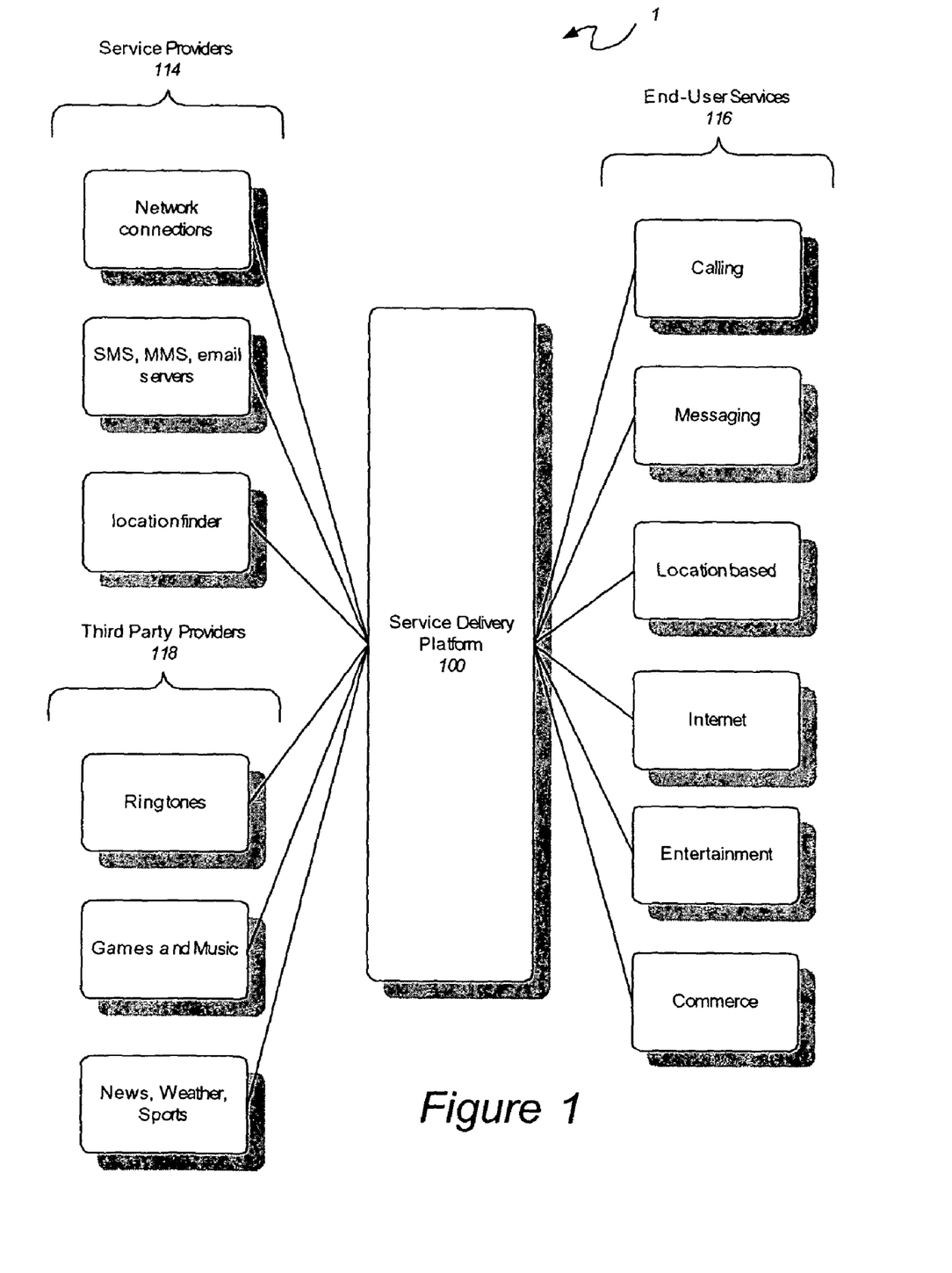
FIG. 1 is functional block diagram of an example system in which techniques for managing communications sessions in a network may be implemented.

FIG. 1 is functional block diagram of a system in which techniques for managing communications sessions in a network may be embodied. With reference to FIG. 1 and by way of illustration, network system 1 includes a service delivery platform 100 that represents a fully integrated Hyper-Text Transfer Protocol (HTTP), Enterprise Java™ Bean (EJB), Servlet and network Session Initiation Protocol (SIP) container. (Java™ is a trademark of Sun Microsystems, Inc.) The service delivery platform provides easy to use, integrated, configuration-driven intermediary between service providers 114, end users 116 and third party service providers 118 that accomplishes (without limitation) the following efficiently and with high availability, scalability and reliability:

Provide a carrier-grade, mobile and network-enabled platform product to facilitate quick creation and/or deployment of new wireline, wireless and cable services.

Provide the ability to build service logic quickly and easily, maximizing reuse in the process, and providing a graphical, easy-to-use design environment.

Provides the ability to upgrade services in flight, without disturbing users of the old version of the application.

Service providers 114 provide, by way of example and without limitation, services such as network connectivity, Simple Messaging Service (SMS), Multimedia Messaging Service (MMS), email, location finders and other services. Third party service providers 118 provide, by way of example and without limitation, services such as ring tones, games and music, news, weather sports and other services. End Users 116 will view the IT services available to them as including, by way of example and without limitation, services such as calling, messaging, location based services, internet, entertainment, commerce and others.

Figure 2:
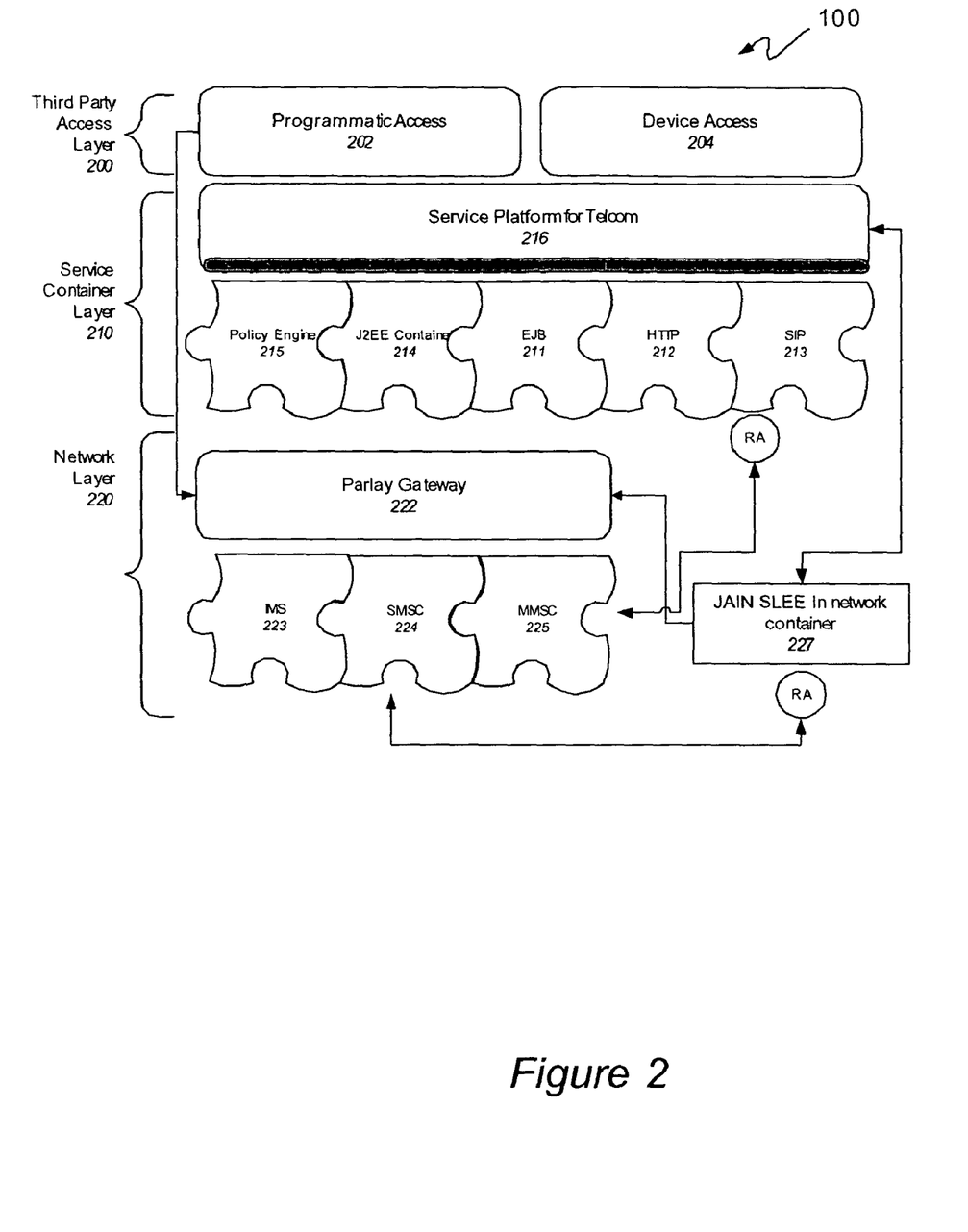
FIG. 2 is a functional block diagram of an example service development platform in an embodiment.

FIG. 2 is a functional block diagram of an example service development platform in an embodiment. As illustrated by FIG. 2 and by way of example, an embodiment of a service delivery platform 100 comprises a third party access layer 200, service container layer 210 and a network layer 220. The third party access layer 200 includes a programmatic interface 202 for providing access to programs using Simple Object Access Protocol (SOAP), HTTP or other protocols. A device interface 204 provides access to devices using any of a variety of device specific protocols.

The service container layer 210 includes a service platform for telecom 212 that comprises a converged Java 2 Executive Edition (J2EE) container 214 merged with an SIP servlet container 213 as defined in JSR 116. A SIP servlet is a Java-based application component that is managed by a SIP servlet container and that performs SIP signaling. The service platform for telecom 216 also includes enterprise Java Bean container 211 and HTTP protocol 212. The service platform for telecom 216 makes use of application convergence trends in the Telecom industry. Operators will use service platform for telecom 216 to build applications that leverage the SIP protocol and the SIP Servlet programming model. The service platform for telecom 216 is intended for usage in a scenario where the underlying network is predominantly SIP and SIP Servlet is adequate as a programming model.

A The Policy Engine 215 is a single logical point in the network for the definition and enforcement of policy for network interfaces. Policies can be made quite general and are protocol and programming model independent. The policy engine 215 provides enforcement of service level agreements (SLAs), e.g., monitors how many messages customer A sends an hour, if over contract limit, customer A starts paying more or stops. In another example policy engine 215 can prioritize traffic according to payment amount/schedule, priorities, and the like. The presence of a policy engine makes the owner of the network much more amenable to opening up the network for access to both internal IT and third party developers, and thereby enables quicker convergence.

Network layer 220 includes a Parlay (protocol) gateway 222 that provides interface with the third party access layer 200 and the service container layer 210 via the policy engine 215, and a JAIN Service Logic Execution Environment (JAIN SLEE) container 227. The JAIN SLEE container 227 implements the JSR 32 specification. The JAIN SLEE 227 comprises a comprehensive programming model for developing asynchronous, event-based applications, and is particularly suited for Telecom applications.

The Network layer 220 enables the development of follow on network elements that replace traditional class 4 or class 5 switches, as well as Softswitches, and "vertical applications" at the edge of the network such as IMS 223, SMSCs (short-message-service-center) 224 and MMSCs (multi-media messaging service center) 225.

Figure 3:
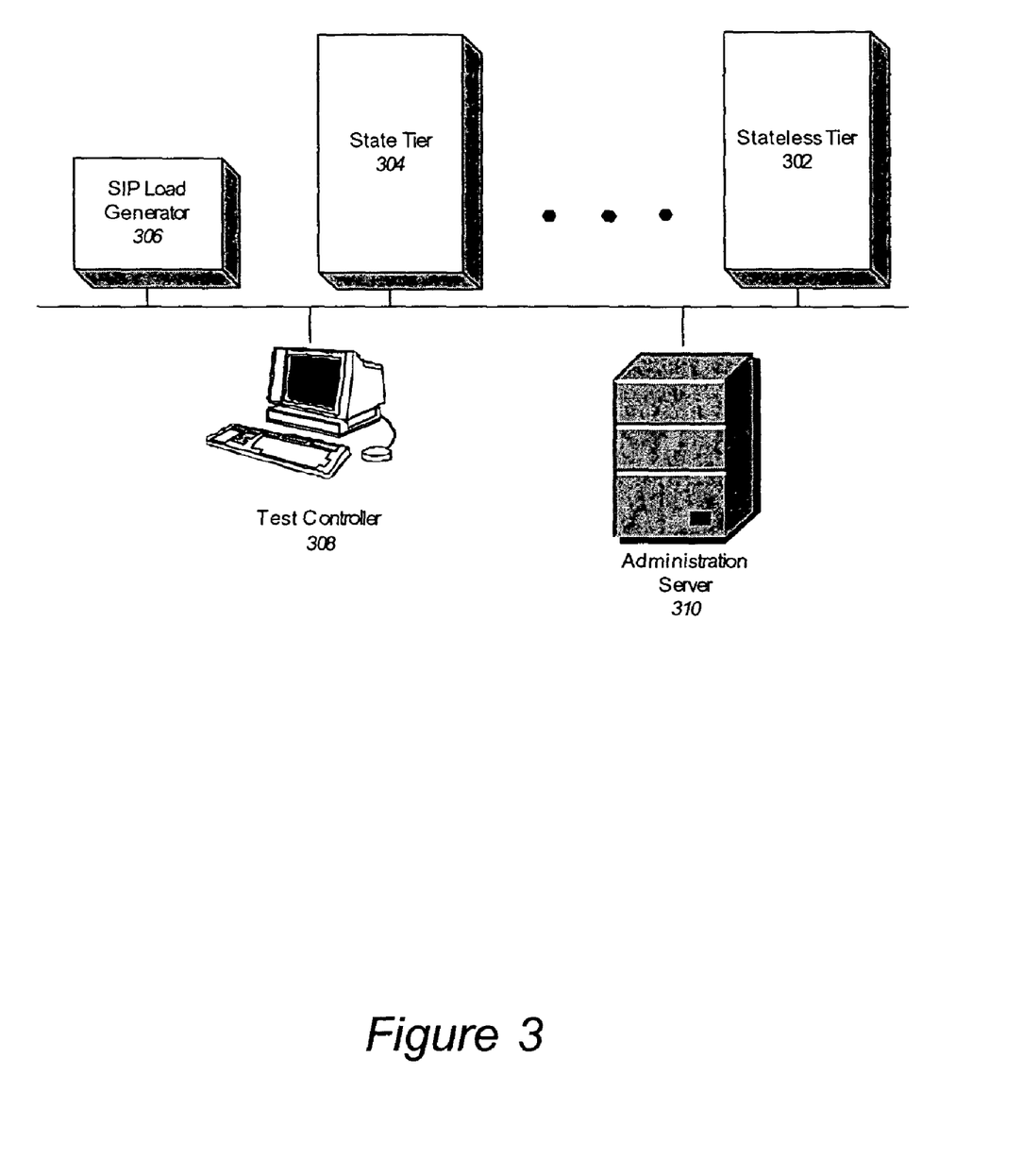
FIG. 3 is functional block diagram of an example logical architecture of a service container in which techniques for managing communications sessions in a network may be embodied.

FIG. 3 is functional block diagram of an example logical architecture of a service container in which techniques for managing communications sessions in a network may be embodied. By way of example and as illustrated by service container 300 of FIG. 3, a new systems architecture provides independent, coordinated execution of business logic implementing services and the like, which executes in nodes that hold no state, and communications connection management logic which executes in nodes having state. A stateless tier 302 contains nodes that are associated with Stripes in the State Tier 304. As used herein, the term "node" refers to a SIP application built on the SIP servlet API (JSR 116). The stateless tier 304 comprises computing resources for supporting application development and execution. In an embodiment, the stateless tier 302 can include 56 Gigabytes of memory allocated in 2 Gigabyte blocks among 28 CPUs.

The state tier 304 comprises computing resources for performing processing in which state is kept. The state tier 304 forms an "in-memory database" in which no state information is stored on disk storage. In an embodiment, state tier 304 is divided into a primary storage area and a backup storage area. In some embodiments, more than one backup area may be provided. In an embodiment, the state tier 304 can include 80 Gigabytes of memory allocated in 2 Gigabyte blocks among 40 CPUs.

In an embodiment, state tier 304 stores state information in a replicated way, using common patterns for striping and replication. As used herein, "Striping" refers to assigning only a single stripe for a given call identifier (call id), e.g., call identifiers <1000 are allocated to the first stripe. The assigned stripe is solely responsible for tracking the call. In an embodiment, two processes back up each stripe. The stripe processes can be distributed such that they are not sharing a power supply, or are vulnerable to a single network router failure, and the like in order to achieve higher reliability. A configuration control process determines where the processes that back up a stripe are located.

In an embodiment, approximately 20 stripes are allocated to 40 machines. The Business to business user agent (B2BUA) does not use stripes explicitly since the stripes mechanism is hidden from it.

In an embodiment, SIP servlets are written against SIP servlet session state. The SIP servlet session states are served up from the stripe as identified by the call identifier, e.g., the state is read from the stripe before control is passed to the SIP servlet. After the SIP servlet returns, the changed state is written to the stripe before sending the messages that were implied by the execution of the servlet.

In an embodiment, state tier 304 stores timers with protocol state in order to optimize the timers. In an embodiment, stateless tier 302 and state tier 304 may be synchronized using a novel protocol.

Figure 4:
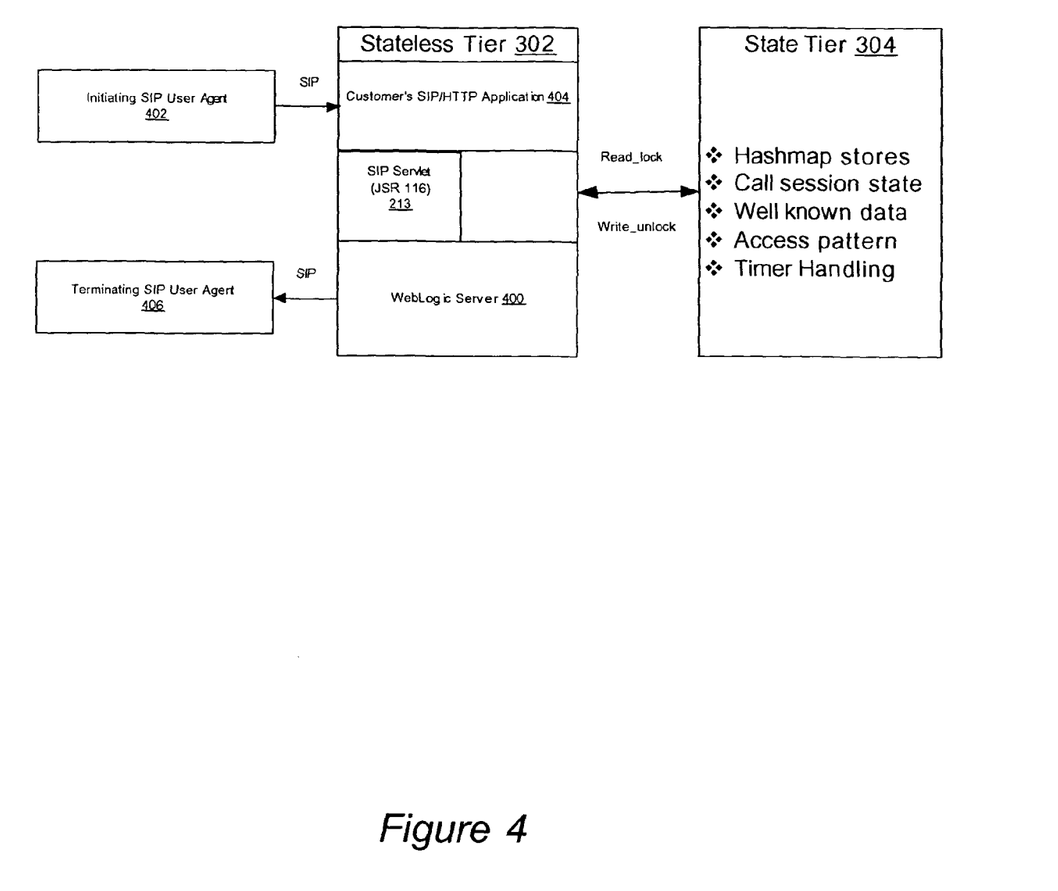
FIG. 4 is functional block diagram of an example of processing an incoming call in a service container in an embodiment.

FIG. 4 is functional block diagram of an example of processing an incoming call in a service container in an embodiment. As shown by FIG. 4 and by way of illustration, an initiating SIP user agent 402 initiates a call to a terminating SIP user agent 406 by dialing into a customer's SIP or HTTP application 404 in a typical usage scenario. The customer's SIP or HTTP application 404 resides in the state tier 302. The SIP Servlet API 213 becomes involved in a communications call during the "dialing" phase.

Since many features require that something remain in the loop until the call is over, the state tier 304 stores information about the call. For example, call waiting needs the ability to interrupt the voice line, accordingly processes need to know how to retrieve the voice line again. Further, this information needs to be associated with the user's profile in memory. The call waiting feature consumes memory for the duration of the call. Other features, e.g., mid-call transfer, pose similar requirements on the system. These features are called Back-to-back User Agents (B2BUA).

In an embodiment, the B2BUA acts as a "man in the middle," acting as the receiver of a call from the original sender, and as a sender of a call going to the next or final destination. The B2BUA has terminated the call as far as the original sender is concerned so it can do the mid-call transfer, or the like, without interrupting the original sender.

The SIP servlet 213 may be incorporated in an SIP servlet container. In one embodiment, the SIP Servlet container is incorporated into an application server product, such as WebLogic® Server by BEA systems of San Jose, Calif.

A novel protocol is employed to coordinate locking and unlocking information in the state tier 304 by the applications executing in the stateless tier 302, as indicated by the "read_lock" and "write_unlock" arrows depicted by FIG. 4.

Figure 5:
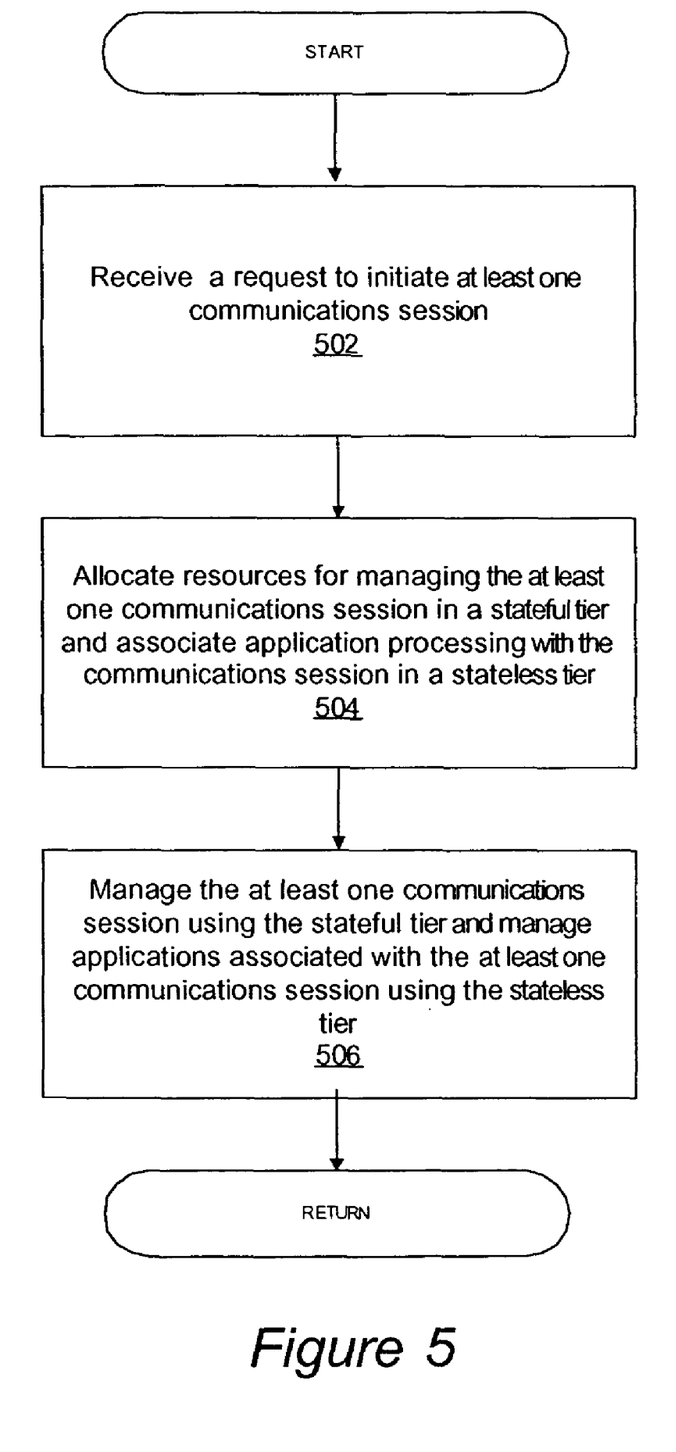
FIG. 5 is an operational flow diagram illustrating a high level overview of a technique for managing communications sessions in a network in an embodiment.

FIG. 5 is an operational flow diagram illustrating a high level overview of a technique for managing communications sessions in a network in an embodiment. The technique for managing communications sessions in a network shown in FIG. 5 is operable with a service container, such as service container 202 of FIG. 2, for example. As shown in FIG. 5, a request to initiate at least one communications session is received from a sender in block (502). Resources for managing the at least one communications session are allocated in a stateful tier and application processing is associated with the communications session in a stateless tier in block (504). The at least one communications session is managed using the stateful tier and applications associated with the at least one communications session are managed using the stateless tier in block (506).

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. The list of advanced features is operators specific. Following is a brief list of advanced features:

Call logs: The ability to view calls made over a given period of time online, ability to associate names with phone numbers, integrate call log information to other applications such as IM.

Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. # of frames per second) will vary. The policy engine enables segmenting the customer base by revenue potential, and to maximize return on investment made in the network Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one which combines wireline and wireless terminal usage scenarios. An example integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A system for managing communications sessions, the system comprising:
   a connection to a network that receives at least one incoming call;
   a server deployed in two separate tiers, said two separate tiers further including:
   a stateful tier including at least one stateful server node that stores and manages session state data associated with at least one communications session established for the at least one incoming call, wherein the at least one stateful server tier includes an inmemory database to store the session state data;
   a stateless tier including one or more applications that provide services to the at least one incoming communication session, including at least one stateless server node that is separate with respect to the at least one stateful server node, said at least one stateless server node having one of the one or more applications that performs SIP signaling, wherein the at least one stateless server node writes session state data to the at least one stateful server node; and
   a communications protocol enabling coordination of the one or more applications in the stateless tier with the at least one incoming communication session in the stateful tier;
   whereupon when the at least one stateless server node receives a service request to access the at least one communication session during the at least one incoming call, the stateless server node interacts with the communication protocol to
   retrieve the session state data, in accordance with a protocol employed to coordinate locking and unlocking of the session state data, from a single stripe in the at least one stateful server node before control is passed to the one of the one or more applications, said single stripe being assigned to an identifier of the at least one incoming call for tracking the at least one incoming call,
   pass control to the one of the one or more applications, wherein the one of the one or more applications processes the service request by performing a read/lock operation on the stateful tier to use the session state data retrieved from the single stripe, and wherein the one of the one or more applications returns control to the at least one stateless node, and
   wherein after the one of the one or more applications returns control to the at least one stateless node, the at least one stateless node updates the session state data on the at least one stateful server node with by performing a write/unlock operation on the stateful tier to write changes to the in-memory database that were caused by one of the one or more applications processing; and
   wherein the at least one stateless node then transmits the messages caused by the processing of the one of the one or more applications.

2. The system of claim 1, wherein the stateful tier comprises:
   a persistence mechanism for persisting communications session information in persistent storage.

3. The system of claim 1, wherein a failure of any one application affects at most in-flight traffic for a stateless node associated with the application.

4. The system of claim 1, wherein an incoming call comprises:
   a request received from sender to initiate communications with an intended recipient.

5. The system of claim 1, further comprising:
   a load balancer that distributes processing load of managing communications sessions over a plurality of processing resources in the stateful tier.

6. The system of claim 1, further comprising an application builder comprising at least one tool for building the applications associated with the stateless tier, providing an ability to build service logic, enabling reuse, and providing a graphical, design environment.

7. The system of claim 1, further comprising:
   performing processing for initiating a communications session within 50 milliseconds.

8. A method for managing communications sessions in a network, the method comprising:
   providing a network that receives at least one incoming call;
   providing a server deployed in two separate tiers, said two separate tiers including a stateless tier and a stateful tier;

maintaining the stateless tier including one or more applications that provide services to at least one incoming communication session, including at least one stateless server node that is separate with respect to a stateful server node, said at least one stateless server node having one of the one or more applications that performs SIP signaling, wherein the at least one stateless server node writes session state data to at least one stateful server node on the stateful tier;

storing and managing session state data associated with the at least one communication session established for the at least one incoming call in the at least one stateful server node, wherein the stateful tier includes an in-memory database to store the session state data, and wherein the at least one stateless server node writes session state data to the at least one stateful server node;

providing a communications protocol enabling coordination of the one or more applications in the stateless tier with the at least one incoming communication session in the stateful tier;

receiving, by the at least one stateless server node, a service request associated with the at least one communications session during the at least one incoming call;

retrieving, by the at least one stateless server node, in accordance with a protocol employed to coordinate locking and unlocking of the session state data, the session state data from a single stripe in the at least one stateful server node, before control is passed to the one of the one or more applications, said single stripe being assigned to an identifier of the incoming call for tracking the incoming call;

processing the service request by performing a read/lock operation on the stateful tier to use the session state data retrieved from the single stripe, wherein the one of the one or more applications returns control to the at least one stateless node;

updating the session state data on the at least one stateful server node by the stateless server node by performing a write/unlock operation on the stateful tier to write changes to the in-memory database that were caused by the one of the one or more applications processing; and transmitting, by the at least one stateless node the messages caused by the processing of the one of the one or more applications.

9. The method of claim 8, wherein processes for managing the communications session are distributed on the network.

10. The method of claim 8, further comprising:
sending a request to initiate a communications session to another computational entity in accordance with the request received from the sender, thereby enabling establishing the communications session.

11. The method of claim 8, wherein receiving, the service request comprises:
receiving, at a back-to-back user agent, an incoming call, the call indicating an entity
with which the communication session is to be established for exchanging information having at least one multimedia component.

12. The method of claim 8, wherein the communications session is established in order to exchanging information that comprises at least one of:
voice over Internet Protocol (VoIP), images, motion picture images, music and data.

13. The method of claim 8, further comprising:
replicating a stripe across a plurality of stateful server nodes.

14. The method of claim 8, further comprising:
enabling processes that manage communication sessions to manage at least 30 million simultaneous call attempts.

15. The method of claim 8, wherein the stateless node comprises a SIP application built on the SIP servlet.

16. The method of claim 8, further comprising:
synchronizing processing in the stateless tier with processing in the stateful tier.

17. The method of claim 8, further comprising:
managing processes that backup communication session information of the stateful tier.

18. A non-transitory computer-readable storage medium carrying one or more sequences of instructions for managing communications sessions, which instructions, when executed by one or more processors, cause the one or more processors to carry out the steps of:

providing a network that receives at least one incoming call;

providing a server deployed in two separate tiers, said two separate tiers including a stateless tier and a stateful tier;

maintaining the stateless tier including one or more applications that provide services to at least one incoming communication session, including at least one stateless server node that is separate with respect to a stateful server node, said at least one stateless server node having one of the one or more applications that performs SIP signaling, wherein the at least one stateless server node writes session state data to at least one stateful server node on the stateful tier;

storing and managing session state data associated with the at least one communication session established for the at least one incoming call in the at least one stateful server node, wherein the stateful tier includes an in-memory database to store the session state data, and wherein the at least one stateless server node writes session state data to the at least one stateful server node;

providing a communications protocol enabling coordination of the one or more applications in the stateless tier with the at least one incoming communication session in the stateful tier;

receiving, by the at least one stateless server node, a service request associated with the at least one communications session during the at least one incoming call;

retrieving, by the at least one stateless server node, in accordance with a protocol employed to coordinate locking and unlocking of the session state data, the session state data from a single stripe in the at least one stateful server node, before control is passed to the one of the one or more applications, said single stripe being assigned to an identifier of the incoming call for tracking the incoming call;

processing the service request by performing a read/lock operation on the stateful tier to use the session state data retrieved from the single stripe, wherein the one of the one or more applications returns control to the at least one stateless node;

updating the session state data on the at least one stateful server node by the stateless server node by performing a write/unlock operation on the stateful tier to write changes to the in-memory database that were caused by the one of the one or more applications processing; and transmitting, by the at least one stateless node the messages caused by the processing of the one of the one or more applications.

* * * * *

UNITED STATES PATENT AND TRADEMARK OFFICE
CERTIFICATE OF CORRECTION

| | | |
|---|---|---|
| PATENT NO. | : 7,870,265 B2 | Page 1 of 1 |
| APPLICATION NO. | : 11/378188 | |
| DATED | : January 11, 2011 | |
| INVENTOR(S) | : Reto Kramer et al. | |

It is certified that error appears in the above-identified patent and that said Letters Patent is hereby corrected as shown below:

On the Title Page

On page 2, 2nd col. Item (56) under "U.S. Patent Documents", line 50, delete "Honkasolo et al." and insert -- Honkasalo et al. --, therefor.

In column 1, line 45, delete "(VOIP)" and insert -- (VoIP) --, therefor.

In column 1, line 49, delete "chum" and insert -- churn --, therefor.

In column 7, line 60, in claim 1, delete "inmemory" and insert -- in-memory --, therefor.

Signed and Sealed this
Twentieth Day of September, 2011

David J. Kappos
*Director of the United States Patent and Trademark Office*